(12) United States Patent
Weimer et al.

(10) Patent No.: US 10,322,550 B2
(45) Date of Patent: Jun. 18, 2019

(54) APPARATUS AND METHOD FOR INFILTRATION OF FIBER MATERIAL WITH RESIN FOR THE PRODUCTION OF A FIBER COMPOSITE COMPONENT

(71) Applicant: Airbus Defence and Space GmbH, Ottobrunn (DE)

(72) Inventors: Christian Weimer, Munich (DE); Juergen Filsinger, Hoehenkirchen-Siegertsbrunn (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 396 days.

(21) Appl. No.: 14/728,399

(22) Filed: Jun. 2, 2015

(65) Prior Publication Data

US 2015/0343714 A1     Dec. 3, 2015

(30) Foreign Application Priority Data

Jun. 3, 2014 (DE) .................. 10 2014 007 869

(51) Int. Cl.
*B29C 70/42* (2006.01)
*B29C 70/54* (2006.01)
(Continued)

(52) U.S. Cl.
CPC ............ *B29C 70/42* (2013.01); *B29C 70/467* (2013.01); *B29C 70/543* (2013.01); *B29C 70/548* (2013.01); *B29L 2031/3076* (2013.01)

(58) Field of Classification Search
CPC combination set(s) only.
See application file for complete search history.

(56) References Cited

U.S. PATENT DOCUMENTS

| 5,316,462 A | 5/1994 | Seemann |
| 6,406,659 B1 | 6/2002 | Lang et al. |

(Continued)

FOREIGN PATENT DOCUMENTS

| DE | 100 07 373 C1 | 11/2000 |
| DE | 694 29 655 T2 | 9/2002 |

(Continued)

OTHER PUBLICATIONS

German Office Action dated Jan. 26, 2015 (four pages).

(Continued)

*Primary Examiner* — Austin Murata
(74) *Attorney, Agent, or Firm* — Crowell & Moring LLP

(57) ABSTRACT

The invention relates to a device for the infiltration of fibrous material with resin for the production of a fiber composite component, comprising a mold tool with a cavity enclosed by at least two tool parts, wherein the mold tool is designed for a relative movement of the at least two tool parts, in such a manner that space can be provided inside the cavity, in a first tool position, to hold the fibrous material, and additional space can be provided to accommodate resin, and the size of the cavity can then be reduced by a movement of the mold tool from the first tool position into a second tool position. According to the invention, a flow promoter is included in the cavity, comprising at least one first layer and one second layer, connected to each other in an edge region of the flow promoter to enclose a flow space, wherein the first layer is impermeable to resin while the second layer provides an outlet for guiding resin out of the flow space and into the fibrous material, and wherein the flow space of the flow promoter is filled with resin and/or the flow promoter has an inlet for conveying resin into the flow space. The invention further relates to a corresponding infiltration process and to a use of the device and/or the method.

6 Claims, 5 Drawing Sheets

Figure 1:
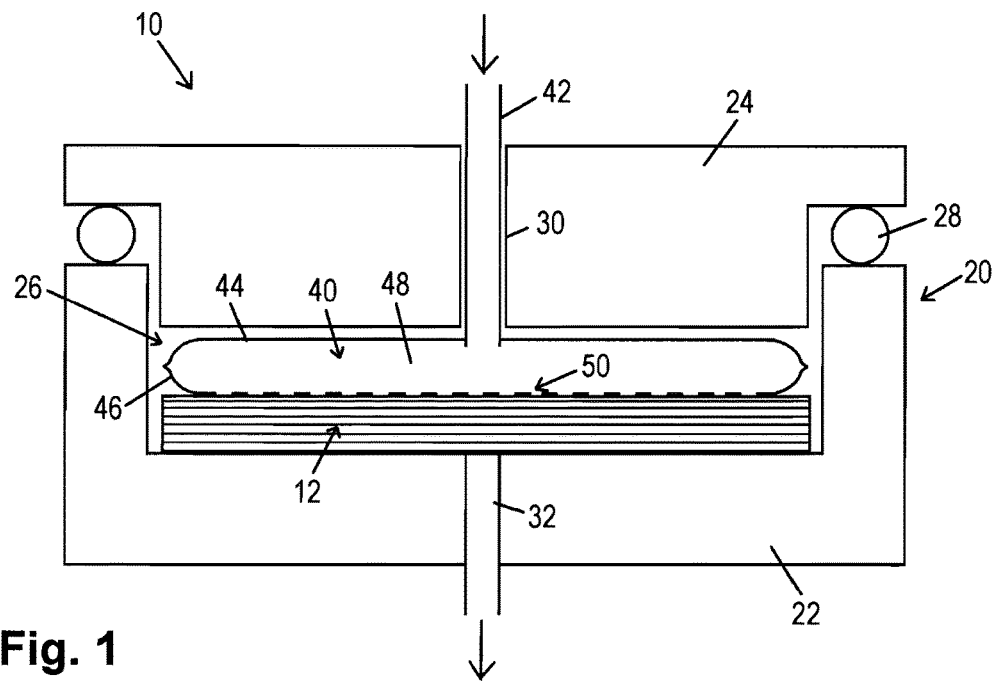

(51) Int. Cl.
*B29C 70/46* (2006.01)
*B29L 31/30* (2006.01)

(56) References Cited

U.S. PATENT DOCUMENTS

| | | | |
|---|---|---|---|
| 2006/0125155 A1* | 6/2006 | Sekido | B29C 70/443 264/511 |
| 2007/0182071 A1* | 8/2007 | Sekido | B29C 33/0066 264/511 |
| 2010/0098870 A1* | 4/2010 | Staunton | B05B 7/2408 427/426 |
| 2013/0266750 A1 | 10/2013 | Grove-Nielsen | |
| 2014/0124976 A1* | 5/2014 | Tateyama | B29C 43/18 264/257 |

FOREIGN PATENT DOCUMENTS

| | | |
|---|---|---|
| DE | 101 57 655 A1 | 6/2003 |
| DE | 101 57 655 B4 | 11/2012 |
| DE | 10 2013 006 940 A1 | 10/2014 |
| JP | 2007-130801 A | 5/2007 |

OTHER PUBLICATIONS

European Search Report issued in European counterpart application No. 15001607.9-1703 dated Dec. 11, 2015, with Statement of Relevancy (Seven (7) pages).

\* cited by examiner

APPARATUS AND METHOD FOR INFILTRATION OF FIBER MATERIAL WITH RESIN FOR THE PRODUCTION OF A FIBER COMPOSITE COMPONENT

CROSS-REFERENCE TO RELATED APPLICATIONS

This application claims priority under 35 U.S.C. § 119 to German Application No. 10 2014 007 869.8, filed Jun. 3, 2014, the entire disclosures of which are expressly incorporated by reference herein.

BACKGROUND AND SUMMARY OF THE INVENTION

Exemplary embodiments of the present invention relate to the production of fiber composite components, and particularly to a device and method for the infiltration of fibrous material with resin for the production of a fiber composite component. In addition, the invention relates to a use of such a device and/or such a method.

Very generally speaking, it is important for achieving high quality in fiber composite components that the resin impregnate the fibrous material as evenly as possible during the resin infiltration process. For this purpose, the use of so-called "flow promoters" is known in the prior art. Such flow promoters, which are included together with the fibrous material being infiltrated in an infusion structure, are typically structures used to facilitate a rapid and/or particularly even distribution of resin in the fibrous material and/or along at least one side—e.g. the flat side—of the fibrous material. The idea of this approach is that the applied resin becomes particularly quickly distributed in the flow promoter due to the low flow resistance of the flow promoter (e.g. large-meshed textile sheets, screen-like woven materials, etc.), such that the resin distributed in the flow promoter can then penetrate further into the fibrous material "by the short route" via the corresponding boundary surfaces and/or surfaces of the fibrous material.

A device in the class and a method in the class are known from DE 101 57 655 B4.

In the known device, a mold tool is used for the infiltration of a preform (fibrous material) with resin, wherein a cavity is enclosed by at least two tool parts which are able to move toward each other but are still sealed against each other, to then hold the preform. The mold tool is designed in such a manner that space can be provided inside the cavity, in a first tool position, to hold the preform, and "additional space" can be provided to accommodate added resin. The cavity can then shrink as a result of a movement of the mold tool from the first tool position into a second tool position, in order to press the resin which remains in the additional space of the cavity, following the resin infiltration, like a wedge from this additional space into the preform.

This approach advantageously allows an economic production of fiber composite components without waste ("excess resin").

In this prior art, rather than a flow promoter, an "additional space" is provided in the mold tool (the column above and below the fibrous material being impregnated) during the infiltration process.

However, it is a disadvantage in this prior art that, particularly when the resin feed rate is comparable, there is a risk of undesired deformations and/or movement of fibers in the adjacent fibrous material during the infiltration process—particularly during the filling of the "additional space" in the tool cavity.

Proceeding from this prior art, the problem addressed by the present invention is that of avoiding the named disadvantage, and particularly of providing a device and a method for the infiltration of fibrous material with resin which enable a comparably fast impregnation of the fibrous material with a comparably low risk of fiber movements.

The device according to the invention is characterized in that a flow promoter is included in the cavity, comprising at least one first layer and one second layer, connected to each other in an edge region of the flow promoter to enclose a flow space, wherein the first layer is impermeable to resin while the second layer provides an outlet for guiding resin out of the flow space and into the fibrous material, and wherein the flow space of the flow promoter is filled with resin and/or the flow promoter has an inlet for conveying resin into the flow space.

The method according to the invention is accordingly characterized in that it also comprises the following steps:
arranging a flow promoter in the additional space of the cavity, wherein the flow promoter has at least one first layer and one second layer, connected to each other in an edge region of the flow promoter to enclose a flow space of the flow promoter, wherein the first layer is impermeable to resin while the second layer provides an outlet for guiding resin out of the flow space and into the fibrous material, and wherein the flow space of the flow promoter is filled with resin and/or the flow promoter has an inlet for conveying resin into the flow space, and optionally conveying resin into the flow space of the flow promoter, such that resin is pressed out of the flow space of the flow promoter and into the fibrous material when the mold tool is moved from the first tool position into the second tool position.

One aspect of the invention is therefore that of deliberately using, in contrast to the intended use thereof, a so-called "flow promoter" in applications of a device in the class, and/or a method in the class—even though the construction of the device and/or the functionality thereof "actually" makes such a flow promoter unnecessary (cf. DE 101 57 655 B4 named above, paragraphs 0002, 0003, and 0013, for example)—to thereby be able to advantageously better control the penetration of the resin into the fibrous material during the infiltration process—and nevertheless not for the purpose of achieving an improved distribution of resin.

According to the invention, undesired fiber movements are prevented by the use of the flow promoter which is arranged in the "additional space" inside the cavity of the mold tool, and provides an "outlet" (which can be optimally adapted to the specific application, by way of example) for guiding resin out of the flow promoter and into the fibrous material.

Because the resin must pass through this outlet in order to penetrate into the fibrous material, it is possible to specifically ensure, by means of a corresponding design of the outlet, that the resin conveyed to the additional space and/or the flow promoter in this additional space is not able, by way of example, to penetrate immediately into the fibrous material entirely unhindered, and (particularly where high injection pressures and/or volume flows are used) result in displacements of the fibers.

The flow promoter, which can have any shape and size in principle within the scope of the invention, preferably is of a flat, elongated, plate- or pillow-like form. Particularly in this case, the flow promoter can be and/or is arranged in the device and/or in the method with one flat side, formed by the second layer, flush against a flat side of a fibrous material which is flatly elongated as a whole.

The "first layer" of the flow promoter is impermeable to resin. This includes any layer through which the resin is not able to pass—even under the temperature and pressure conditions which are adjusted to functionally match the particular application situation.

The term "resin" in the context of the invention is used to indicate a material which is suitable for forming a fiber composite component with a fibrous material. This material (matrix material) can also contain a curing agent, by way of example (as a multi-component resin system). "Resin" in the narrower sense of the word refers to thermosetting plastics such as epoxide resin systems. However, all thermoplastic duromers, by way of example, should be included.

The "second layer" of the flow promoter provides the above-noted outlet for the resin. The term "outlet" in this case means a single opening, or preferably a plurality of openings, through which the resin can exit, particularly when there is an overpressure (with respect to the pressure on the other side of the outlet—that is, the space in which is found the fibrous material being infiltrated).

In one embodiment, the outlet of the second layer is provided by a perforation in the second layer and/or by a permeability to resin, produced by the material itself, in the second layer.

The outlet preferably comprises a plurality of openings (perforations) which are configured in the second layer in such a manner that it is possible to press the resin into the fibrous material at many points without the resin needing to flow over greater distances through the fiber material.

The two layers of the flow promoter named above can be formed from a film material and/or a textile material, by way of example. In one embodiment, the first layer is made of a film material (preferably of plastic), and the second layer is made of a textile material. As an alternative, the second layer can also be made, by way of example, of a film material which is nevertheless suitably perforated, for example.

In one embodiment, the device according to the invention also comprises resin feed means for the purpose of feeding resin into the flow space of the flow promoter. Such resin feed means can include, by way of example, one or more channels in the region of the at least two tool parts, wherein resin can be allowed to flow through the same into the flow promoter (for example via a tube which connects the opening of such a channel in the cavity with the inner space (flow space) of the flow promoter).

As an alternative to such a feed of resin via resin feed means of the device, it is also possible within the scope of the invention that a flow promoter which is filled in advance with resin is arranged in the cavity of the mold tool together with the fibrous material. In this case, with the flow promoter laid in place (and already filled), there is no need for a subsequent feed of resin into the flow space of the flow promoter.

The second layer of the flow promoter can possess, by way of example, advantageous separating properties with respect to the resin used (for example as the result of a corresponding surface treatment or coating) in order to make it possible to easily separate the flow promoter from the cured fibrous material after the infiltration process and/or the production of the fiber composite component is complete (by, for example, thermal curing of the infiltrated fibrous material).

In one embodiment of the invention, a perforated separating film and/or a so-called peeling sheet is used between the flow promoter and the fibrous material.

As an alternative, however, it is possible within the scope of the invention to leave the flow promoter on and/or in the finished fiber composite component following the completion of the infiltration process. In this case, the use of, by way of example, a material for the two layers, said material breaking up and/or dissolving in the resin used—for example to achieve an intended modification of the resin properties at the affected component interface and/or surface—can be contemplated.

The second layer of the flow promoter, which faces the fibrous material, can have properties such that it is not permeable for the matrix material at low differences in pressure (e.g. up to about 1 bar), but becomes permeable once a certain pressure difference is exceeded (e.g. 2 bar) (for example due to a microporous material structure of the second layer). As an alternative or in addition thereto, a permeability and/or a significantly elevated permeability can also be created by a certain temperature being exceeded by the resin (that is, by passing beyond a certain (temperature dependent) viscosity of the resin).

A further possibility for creating permeability in the second layer for the resin in the specific application during the production process is that of designing this second layer in such a manner that regions of the second layer melt when a certain temperature is exceeded (whether that be as a result of the feed of resin, for example, or as a result of the tool being heated for this purpose, for example).

In one embodiment, the device further comprises air discharge means to discharge air from the cavity. These air discharge means can also comprise, by way of example, channels which are constructed in the region of the at least two tool parts (passing through at least one of these).

In this context, it is advantageous if the mold tool is designed in such a manner that the cavity can be closed in an airtight manner—particularly such that this airtight configuration can be maintained in both the first tool position and the second tool position, as well as during a movement between these two tool positions. For this purpose, there can be a compressible seal inserted by way of example in a gap on the edge of the two tool parts, running around the same, becoming accordingly compressed and/or elongated when the two tool parts move toward each other or away from each other, and thereby ensuring an airtight seal of the edge gap between the tool parts. As an alternative or in addition thereto, tool parts which are able to move with respect to each other can also be sealed by direct contact with each other.

The two layers of the flow promoter can be connected to each other in their edge region in a variety of ways. The layers are preferably welded, glued, or sewn together in the edge region, and a combination of these connection types can also be used. The edge region therefore preferably has a weld seam, a glue seam, and/or a sewn connection. This connection is preferably constructed running around the periphery, although there can also be an interruption at least at one position of this contour in order to form and/or allow the passage of the inlet of the feed of resin into the flow space at this point.

According to one embodiment, the two layers of the flow promoter have already been connected to each other during the production of the flow promoter (e.g. by welding).

As an alternative, the flow promoter could also have separate layers (e.g. films) which are inserted into the respective mold tool and then connected to each other at that time—for example running laterally outside of the fibrous material edge together toward a lateral edge of the tool, and being connected to each other there (e.g. by gluing or by being pressed against each other by means of a peripheral seal and then pressed against a tool part surface). In this case, the "connection of the layers to each other in an edge region of the flow promoter" would only take place during the application.

The fact that the two layers are connected to each other "in an edge region of the flow promoter" does not necessarily mean that this edge region also constitutes an edge region of the two layers. Rather, at least one of the layers can extend beyond said "edge region of the flow promoter" (cf. the examples according to FIGS. 3 and 5 described below, for example).

In one embodiment, the first layer of the flow promoter is impermeable to resin, but allows the passage of air, and the flow promoter also comprises a third layer which is impermeable to resin, impermeable to air, is arranged on the side of the first layer which faces away from the second layer, and is connected to the first layer in the edge region of the flow promoter. In this construction, when air is suctioned out of the intermediate space between the first and third layers by means of a suitable means, the space of the cavity which surrounds the flow promoter can advantageously be evacuated as a result of the first layer allowing the passage of air—said space particularly also being the space assumed by the fibrous material. Then, resin can be introduced via the inlet of the flow promoter which opens into the flow space (between the first and second layers). In the process, the negative pressure between the first and third layers facilitates the evacuation of the flow space.

In one embodiment of the infiltration method according to the invention, the fibrous material and the flow promoter are first arranged in the cavity of the mold tool, then the resin is conveyed into the flow space of the flow promoter by means of resin feed means of the device. Finally, the size of the cavity is reduced by an adjustment of the mold tool from the first tool position into the second tool position, such that resin is pressed out of the flow space and into the fibrous material via the outlet provided by the second layer, as a result of this adjustment. As mentioned above, however, it is also possible for the flow promoter, already filled with resin, to be arranged in the cavity of the mold tool, thereby rendering the step of feeding resin unnecessary.

In one embodiment, substantially more space is available inside the cavity to accommodate the fibrous material after the movement of the tool into the second tool position.

According to the invention, the device described and/or the method described are preferably used to produce a plate-like or cup-like fiber composite component. In the simplest case, such a fiber composite component is a single- or multi-layer fibrous material laminate. However, within the scope of the invention, fiber composite components can be produced which are formed of multiple layers—partly of fibrous material and partly of another material. So-called sandwich components are one example of this. There are at least three layers in a sandwich component, typically termed a core layer and cover layers (arranged on both side of the core). In such a construction, the invention can be used, by way of example, for the purpose of connecting these three layers to each other in a mold tool, thereby achieving an infiltration of each of the cover layers made of fibrous material. In this case, a foam layer, preferably closed-cell foam, can particularly be used as the core layer, for example. As an alternative, a so-called honeycomb structure (e.g. of paper, cardboard, plastic, etc.) can also be used, by way of example. In the latter case, it is advantageous if the honeycomb structure is utilized with a seal on the end-face thereof (e.g. with honeycomb structure cover layers which are impermeable to resin), in order to prevent the honeycombs from filling up completely with resin in an undesired manner.

The following advantages are achieved in particular in the production of fiber composite components using the invention:

faster distribution of the matrix materials (resin) and impregnation of the fibrous material (for example provided either dry or as a pre-impregnated preform), with accordingly shorter cycle times and/or the ability to use more reactive resin systems (e.g. epoxide resin systems; wherein thermosetting plastics can also be contemplated, for example) and/or matrix systems with higher viscosity (e.g. rubberized systems), avoidance of fiber displacements even at high resin injection pressures and/or volume flows, an optimization of the resin filling process does not require any, or any significant, changes to existing mold tools (e.g. the position(s) of the injection point(s)). Rather, an adaptation of the properties of the "outlet" of the flow promoter (e.g. the pattern of perforations) is generally sufficient to enable shorter development times and lower development costs, and to easily implement component or process modifications.

depending on the embodiment, the difficulty of cleaning the mold tool following the production of a fiber composite component is reduced, or the cleaning is eliminated.

BRIEF DESCRIPTION OF THE DRAWING FIGURES

Figure 2:
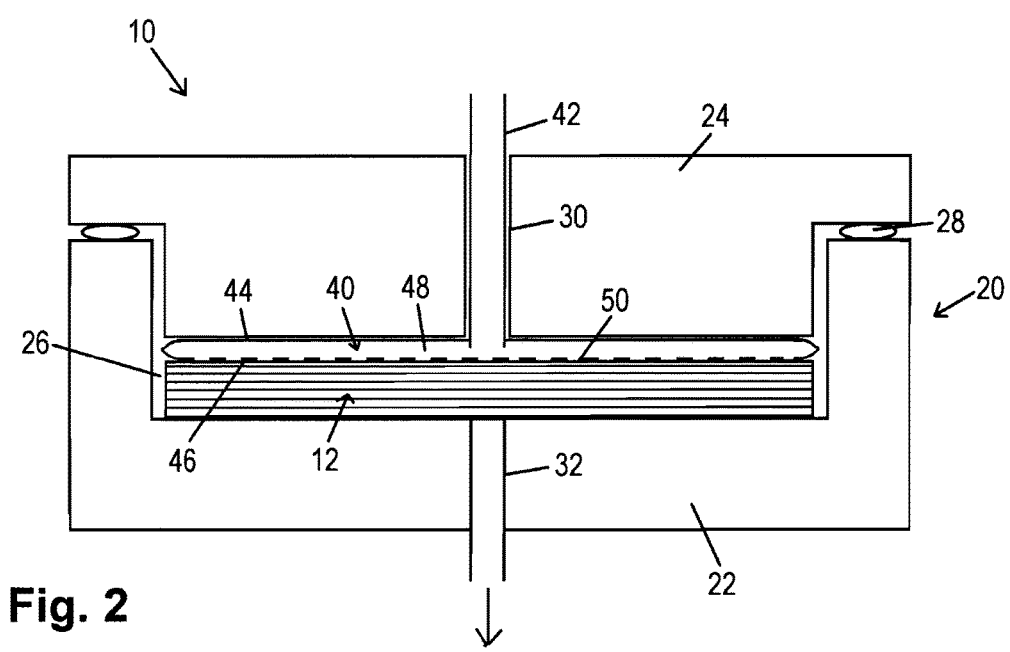
Figure 3:
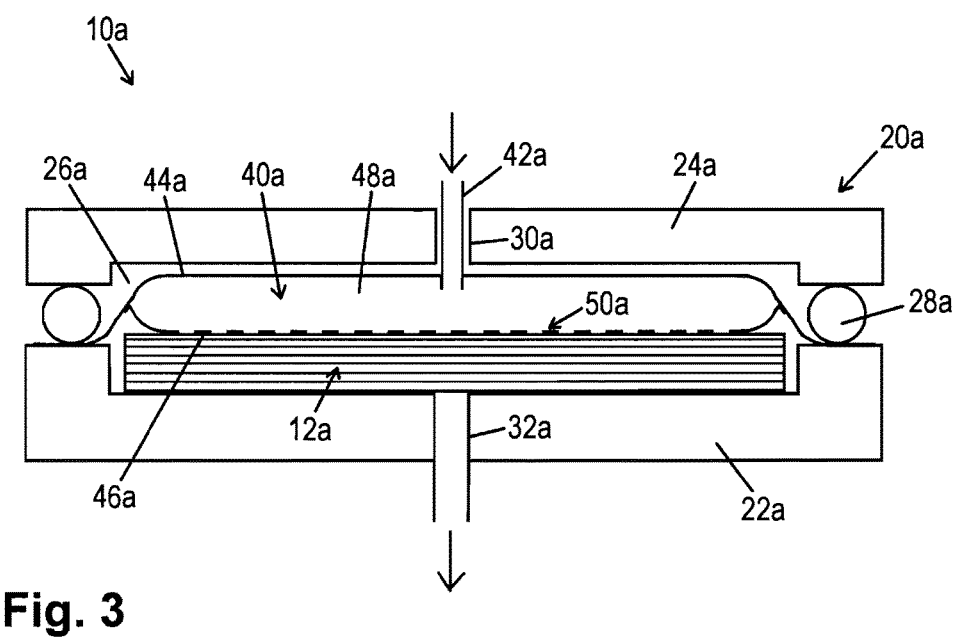
Figure 4:
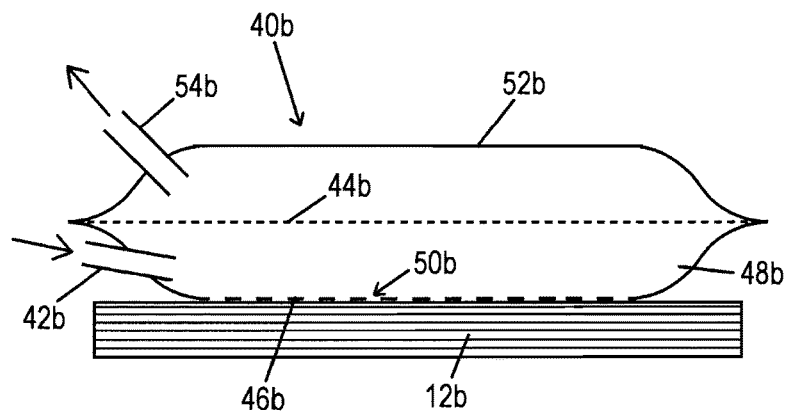
Figure 5:
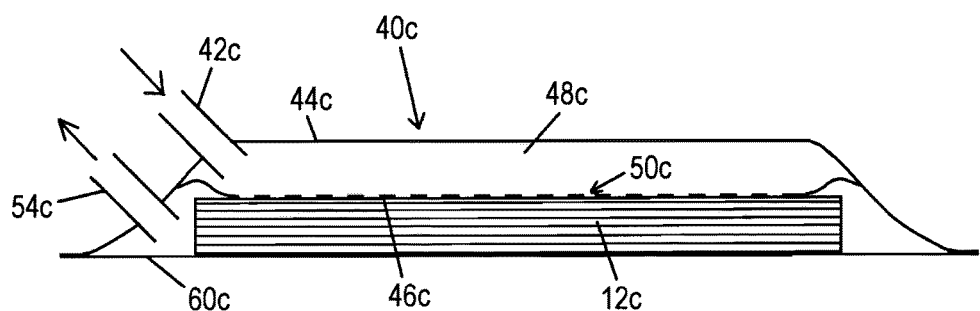
Figure 6:
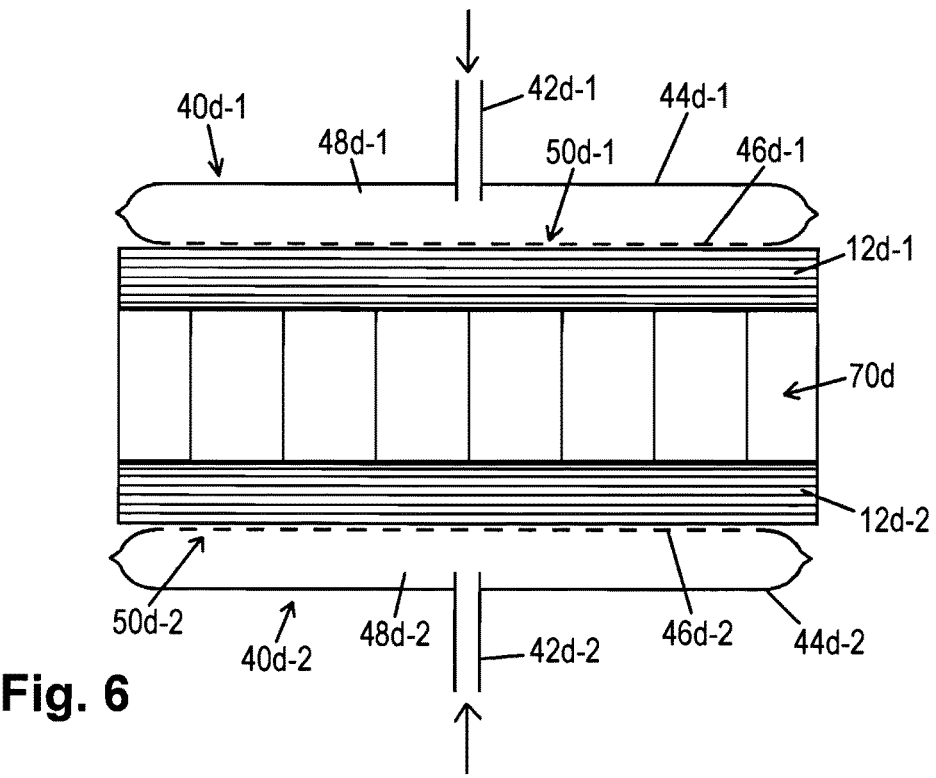
Figure 7:
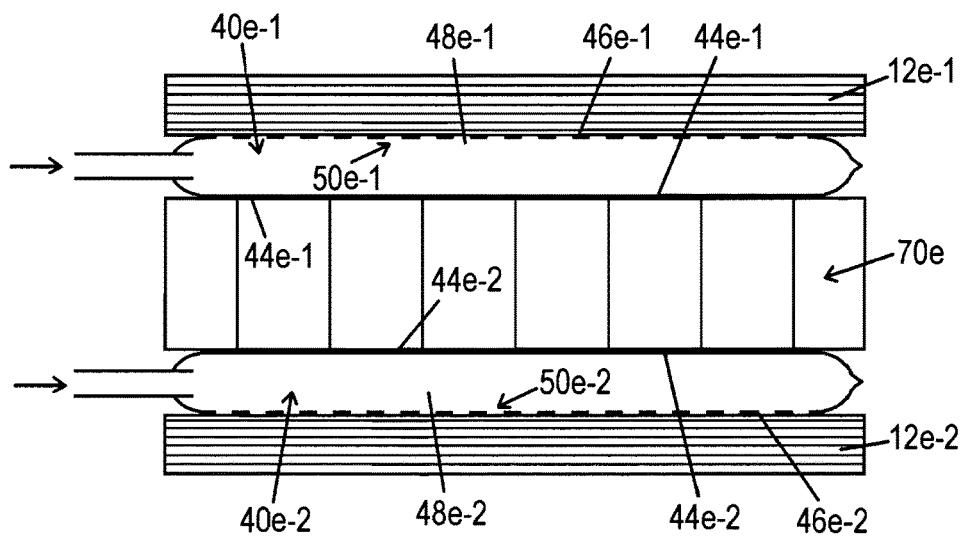
Figure 8:
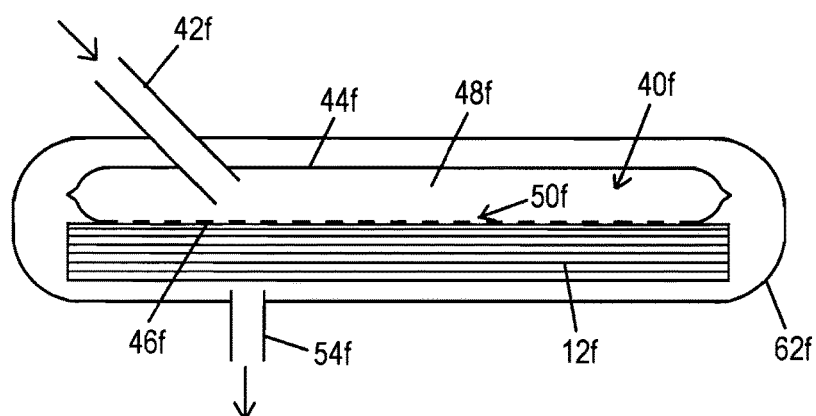
Figure 9:
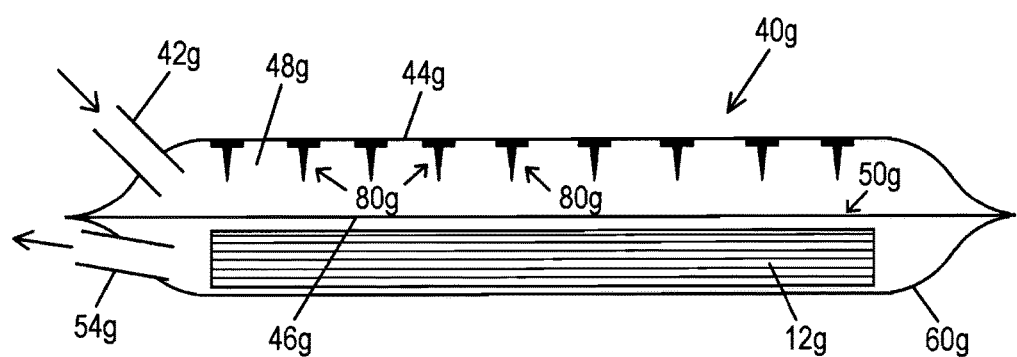

The invention is described below in greater detail with reference to embodiments and to the attached drawings, wherein:

FIG. 1 schematically shows a first embodiment of a device and of a method for the infiltration of fibrous material with resin, for the production of a fiber composite component, in a first method step ("the first tool position"), FIG. 2 schematically shows an illustration corresponding to that of FIG. 1, in a second method step ("the second tool position"), FIG. 3 schematically shows an illustration corresponding to that of FIG. 1, according to a further embodiment, FIG. 4 schematically shows one embodiment of a flow promoter with a modified design (a three-layered construction), FIG. 5 schematically shows a further embodiment of a flow promoter, FIG. 6 schematically shows an illustration to clarify the infiltration of fibrous material during the production of a sandwich component, FIG. 7 schematically shows an illustration corresponding to that of FIG. 6, according to a modified embodiment, FIG. 8 schematically shows a further embodiment of a flow promoter, and FIG. 9 schematically shows a further embodiment of a flow promoter.

DETAILED DESCRIPTION

FIG. 1 shows one embodiment of a device 10 for the purpose of infiltrating fibrous material 12 with resin, for the production of a fiber composite component (by curing the fibrous material 12 which has been infiltrated with resin).

The device 10 comprises a multi-part mold tool 20—consisting of two parts in the illustrated example—with a lower tool half 22 and an upper tool half 24.

These tool parts 22, 24 enclose a cavity 26 of the mold tool 20 in which is arranged the fibrous material 12 which will be infiltrated.

In the illustrated example, a seal 28 which runs around the lateral edge of the tool 20 as illustrated (made of, for example, an elastomer) provides an airtight seal of the cavity 26 from the surroundings.

In addition, the tool 20 in the illustrated example comprises a resin feed channel 30 which runs through the upper tool half 24, and an air discharge channel 32 which runs through the lower tool half 22.

The resin feed channel 30 is connected to a controllable resin feed source which is not illustrated in the figure, while the air discharge channel 32 is connected to a vacuum pump which is not illustrated in the figure. The air discharge passage and/or vacuum pump in this case is/are preferably equipped with a so-called resin trap.

The tool 20 is designed to move the tool parts—in this case the lower tool half 22 and the upper tool half 24, relative to each other, in such a manner that space is provided in a first tool position (according to FIG. 1) inside the cavity 26 for the purpose of receiving the fibrous material 12, and additional space is provided to receive the resin, and/or the resin in a "flow promoter" 40, arranged adjacent to and together with the fibrous material 12 (in this case: lying flat) in the cavity 26.

The size of the cavity 26 can be reduced by a movement of the tool 20 from the first tool position (FIG. 1) into the second tool position (FIG. 2). In the embodiment illustrated, the size of the cavity 26 is reduced until there is substantially only space to accommodate the fibrous material 12 inside the cavity 26. The impregnation of the fibrous material 12 according to the method shown via FIGS. 1 and 2 can proceed, by way of example, as follows:

First, the dry fibrous material 12 is inserted together with the flow promoter 40 into the multi-part mold tool 20, the same already vacuum-tight in the first tool position (FIG. 1) but nonetheless providing more space in the cavity 26 than would be necessary for the thickness of the fibrous material 12 and/or the intended thickness of the component to be produced therefrom.

The loaded tool 20 is evacuated in the first tool position by pumping out air via the air discharge channel 32. In addition, the required amount of resin is injected via the resin feed channel 30, specifically through a resin feed tube 42 of the flow promoter 40 which is routed through the channel 30 and is sealed with respect to the channel 30 (and is not illustrated).

The flow promoter 40 includes a first layer 44 and a second layer 46 which are connected to each other in an edge region of the flow promoter 40, the same having the overall form of a plate or pillow, in order to enclose a flow space 48. The shape of the flow promoter 40 is matched to the contour of the surface (flat side) of the fibrous material 12 adjacent to the second layer 46. The first layer 44 is impermeable to resin, and is formed by a plastic film, for example, whereas the second layer 46 provides an "outlet" 50 through which resin can be conveyed out of the flow space 48 and into the fibrous material 12 (for the purpose of impregnating the same). The second layer can, by way of example, likewise be made of plastic film—for example with a suitable perforation (which is shown symbolically in FIGS. 1 and 2 by a dashed line indicating the second layer 46).

The resin fed into the flow space 48 in a first method step is quickly distributed without hindrance over the entire flow space, and/or consequently over the entire surface of the adjacent fibrous material 12, wherein the more or less "resin-retaining" function of the outlet 50 prevents undesired fiber displacements in the fibrous material 12 even with a rapid injection of the resin material. Rather, at this stage, flow is substantially or exclusively (depending on the injection conditions and the design of the outlet 50) oriented laterally in the flow space 48.

The infiltration process can also be guided, for example, in such a manner that the upper tool half 24 is lifted as a result of the pressure in the inflowing resin, in order to release a "flow gap" between the tool halves 22, 24.

Next, the resin feed channel is closed by a corresponding valve, for example, and the tool 20 is moved, by way of example hydraulically, pneumatically, or electrically, from the first tool position (FIG. 1) into a second tool position (FIG. 2) in which the size of the cavity 26 is reduced. In the illustrated example, the size of the cavity 26 is reduced to such an extent that there is then only sufficient space to accommodate the fibrous material 12 therein.

As a result of this movement of the tool 20, the resin is pressed out of the flow space 48 of the flow promoter 40, through the outlet 50 (perforation holes of the second layer 46) and into the fibrous material 12. The fibrous material 12 in this case is impregnated by resin over its entire thickness.

The suctioning of air via the air discharge channel 32 can be halted, at the latest, after the, by way of example, thermal and/or thermally-facilitated curing of the resin in the fibrous material 12 is complete—said curing advantageously taking place in the same tool 20—then the tool 20 opened for the removal of the finished fiber composite component. It can frequently be contemplated that the suctioning of air is halted directly before or during the injection of the matrix material in order to prevent, by way of example, the matrix material from penetrating into the vacuum system.

The side of the flow promoter 40 (second layer 46) which faces the fibrous material 12 can be made such that it is not permeable to the resin under normal environmental conditions (e.g. room temperature and a max. of 1 bar pressure difference), and rather only becomes permeable once a certain differential pressure and/or a certain temperature is/are exceeded (that is, when the viscosity of the resin material fed into the cavity drops below a certain threshold). This can be adjusted by a corresponding design of the outlet 50—that is, a suitable sizing and arrangement of perforation holes and/or, by way of example, a microporous structure of the layers and/or film materials used. In addition, the permeability can be created by a "melting of a seal"—for example comparatively low-melting regions of the second layer 46.

In a manner different from the illustrated embodiment, a perforated separating film and/or a so-called tear-off fabric could also be inserted between the flow promoter 40 and the fibrous material 12 in order to make it possible to more easily separate the flow promoter 40 from the fiber composite after the fiber composite component is produced.

As an alternative, the flow promoter 40—at least on the side thereof which faces the fibrous material 12 during the production process—can have separating properties, for example due to a suitable surface treatment and/or coating of the second layer 46.

In addition, in a manner different from the illustrated example, it can also be contemplated that the flow promoter 40 and/or the two layers 44, 46 thereof consist of a material which dissolves onto or into the resin used, in order to use the material of the flow promoter 40 to a certain degree as a surface material for the finished fiber composite component—perhaps to achieve a modification of the resin properties on the surface of the component.

In the following description of further embodiments, the same reference numbers are used to indicate components with the same function, each complemented by a small letter to differentiate the embodiment. For the most part, the description only addresses the differences with the embodiments described above. In other regards, attention is hereby expressly directed to the description of the embodiments above. Advantageous features of each of the individual embodiments can also be combined with each other.

FIG. 3 is an illustration corresponding to that of FIG. 1, to demonstrate a further embodiment. In addition to the somewhat modified form of the tool halves 22a, 24a of a mold tool 20a, a further difference in comparison with the example in FIGS. 1 and 2 is that, when a flow promoter 40a is used, one of the two layers 44a, 46a—in this case, the first layer 44a by way of example—extends beyond the edge region of the flow promoter where the two layers 44a, 46a are connected to each other, and is sealed in an airtight manner to the lower tool half 22a laterally outside of the edge of the fibrous material 12a.

This has the advantage that, in a first stage of the infiltration process, the flow promoter 40 lies against the fibrous material 12 as a result of air being suctioned out via an air discharge channel 32 constructed in the tool part 22a, thereby fixing and/or compacting the same. The upper tool half 24a can be arranged in this stage at a certain distance above the structure (in the first tool position), such that it can be contemplated for the subsequent resin injection into the flow promoter 40a that this injection, rather than occurring as shown symbolically in FIG. 3 via a resin feed channel 30 of the upper tool half 24a and/or a resin feed tube 42a which runs through the same, said injection takes place via a resin feed tube 42a (not illustrated) routed through an "injection gap" between the tool parts 22a, 24a.

As a result of resin being injected into the flow space 48a of the flow promoter 40a, the upper (first) layer of the flow promoter 40a is lifted until it comes to lie against the upper tool half 24a. The resin again becomes quickly distributed in the flow space 48 without simultaneously resulting in undesired fiber displacements in the fibrous material 12.

Next, the tool 20a is moved from the first tool position (FIG. 3) into a second tool position with a reduced cavity 26 size, in order to press the resin out of the flow promoter 40a vertically into the fibrous material 12.

Although the method according to FIGS. 1 and 2 can be termed a modified injection pressing (RTM process), the method according to FIG. 3 also has so-called "vacuum film" characteristics of a so-called vacuum infusion process, due to the use of the first layer 44a.

In contrast to the example in FIG. 3, wherein a flow promoter 40a is used which can be considered prefabricated because its layers 44a, 46a have been connected to each other during the production of the flow promoter 40a, two separate layers (e.g. films) could be inserted into the tool 20a and together sealed against the tool 20a laterally outside of the fibrous material edge. In this case, the "connection of the layers to each other in an edge region of the flow promoter" would then only occur during the situation of use. In the example according to FIG. 3, therefore, two such separate layers 44a, 46a could each be guided to the edge of the lower tool half 22a and then sealed in an airtight manner there, by way of example. This is again illustrated by way of example with the use of a seal 28a as in FIG. 3, or by a temporary gluing of the two layers 44a, 46a to each other and to the edge of the tool half 22a, for example.

FIG. 4 shows a further embodiment of a flow promoter 40b which can be used in the devices and/or methods described here, with a three-layer construction, particularly of a resin-impermeable first layer 44b, a second layer 46b which provides an outlet 50b, and additionally a third, resin-impermeable and airtight layer 52b which is arranged over the first layer 44b and connected to the same on the edge thereof. It is furthermore also essential, in the following description of the functionality of the flow promoter 40b, that the first layer 44b is impermeable to resin but permeable to air. In the structure as a whole, the first layer 44b therefore essentially forms a "semipermeable membrane" (impermeable to resin, permeable to air) which divides the interior of the flow promoter 40b into two chambers. The flow promoter 40b then comprises two chambers, specifically in FIG. 4 a lower, "resin guiding" chamber, facing the fibrous material 12b, and a chamber thereon, arranged above the same in FIG. 4, which below is called a "vacuum chamber."

The resin-guiding chamber has (as in the examples already described above) at least one resin feed connection and/or, by way of example, a resin feed tube 42b. The vacuum chamber likewise has at least one connection—in this case an air discharge tube 54b.

The impregnation of the fibrous material 12b in a configuration which uses the flow promoter 40b can be carried out as follows:

After the fibrous material 12b, with the flow promoter 40b arranged thereon, has been inserted into the proper mold tool (not illustrated in FIG. 4), the vacuum chamber is evacuated via the air discharge tube 54b. As a result of the "semipermeable membrane" (first layer 44b) and the second layer 46b which lies thereunder, which faces the fibrous material 12b and/or lies against the same, and which provides the outlet 50b (e.g. perforation), the fibrous material 12b, which is still dry, is also evacuated in the respective space of the tool cavity. This occurs, by way of example, both when a tool 20 as in FIGS. 1 and 2 is used, and also when a tool 20a is used, as in FIG. 3 (with a corresponding modification of the flow promoter 40b). Consequently, the flow promoter 40b can also be used as described above for modification of the example according to FIG. 3, particularly with a sealing of the three layers 44b, 46b, 52b to each other, and against the lower tool half, in order to enable the evacuation of the fibrous material 12b, optionally with the tool still open.

Then, the necessary amount of resin is conveyed via the resin feed tube 42b of the resin-guiding chamber into the flow space 48b of the flow promoter 40b. In the process, a vacuum which is still applied to the vacuum chamber can support the degassing of the resin flowing past the membrane (first layer 44b) beneath the same.

As soon as sufficient resin has been injected, the mold tool is closed (movement from the first to the second tool position). As a result, the resin material in the resin-guiding chamber is pressed through the outlet 50b of the second layer 46b out of the flow promoter 40b and into the fibrous material 12b. The semi-permeable membrane 44b in this case blocks the resin, and (ideally) no resin penetrates into the vacuum chamber.

FIG. 5 shows a further embodiment of a flow promoter 40c which can be used within the scope of the invention, again comprising a resin-impermeable first layer 44c and a second layer 46c which provides an outlet 50c.

In contrast to the embodiments described above, a further layer 60c, as illustrated in FIG. 5, is bonded to the flow promoter 40c in such a manner that a fibrous material 12c is bonded to the flow promoter 40c, and specifically in a chamber which is formed between the second layer 46c and the further layer 60c and/or is enclosed by these two layers 46c, 60c. An edge region of the further layer 60c is connected around the periphery thereof for this purpose—for example by a section of the first layer 44c which projects laterally beyond the edge of the flow promoter 40c.

In this embodiment, a fibrous material 12 (e.g. preform) sealed in a film can be used, wherein the fibrous material 12 is accordingly manufactured and provided together with the flow promoter 40c. The "upper chamber" in FIG. 5 (between the layers 44c and 46c) forms a flow space 48c and is configured with a resin feed connection and/or resin feed tube 42c, whereas the "lower chamber" in FIG. 5 (between the layers 46c and 60c) is configured with an air discharge connection and/or air discharge tube 54c. The connections named above are each preferably given a design allowing closing.

For the preparation of the fiber composite production process, the construction illustrated in FIG. 5 can, if desired, therefore be provided with pre-vacuumed fibrous material 12c and/or with an existing resin fill (the "upper chamber"), and if necessary be further processed with a mold tool of the type described above. As an alternative, the vacuuming and/or the feed of resin into the flow space 48c of the flow promoter 40c can be performed in the tool—for example as described above for the preceding examples.

Then, when the tool is closed, the buildup of pressure in the direction of the thickness generates flow through the layer 46c, and therefore presses the resin into the fibrous material 12c.

The device according to the invention and/or the method according to the invention can be used in a particularly advantageous manner for the production of a plate-like or cup-like fiber composite component, as demonstrated above using the preceding embodiments. In particular, the invention can also be used for the production of so-called sandwich components, in which, by way of example, the two sandwich cover layers can be designed as a fiber composite, and a sandwich core arranged between these can be constructed from any other chosen material (e.g. foam or a structure made of paper, plastic, etc. in a honeycomb pattern, by way of example). Two exemplary production methods for such sandwich components are described below with reference to FIGS. 6 and 7.

FIG. 6 shows a construction for the production of a sandwich component, said construction consisting of a honeycomb core 70d and two cover layers to be bonded thereto, in the form of a first fibrous material 12d-1 and a second fibrous material 12d-2. The fibrous materials 12d-1 and 12d-2, termed individually or together below as "fibrous material 12d," are first inserted, together with two flow promoters 40d-1 and 40d-2, arranged as illustrated in FIG. 6 and still dry, into the appropriate mold tool (not illustrated).

The flow promoters 40d-1, 40d-2 in this example have the same construction and the same function as, for example, the flow promoters described above in the context of the examples according to FIGS. 1 to 3.

The sandwich component is constructed by the infiltration of the fibrous materials 12d using the flow promoters 40d—in principle just as in the examples according to FIGS. 1 to 3, such that there is no need here to continue with a detailed explanation. It is noted, however, that due to the "double arrangement" of fibrous materials 12d and flow promoters 40d in the "first tool position," it is necessary to provide additional space for two resin-filled flow promoters in the cavity of the tool, and the feed of resin must likewise be doubled. When a tool of the type illustrated in FIGS. 1 to 3 is used, the lower tool half could be configured for this purpose, by way of example, with a further resin feed channel (for the passage of the additional resin feed tube of the second flow promoter 40d-2). In addition, an air discharge channel of the tool could run in this case advantageously out of the cavity in the lateral direction (through at least one of the tool parts).

In the example shown in FIG. 6, after the tool is moved into its "second tool position," and after the subsequent curing of the resin in the fibrous materials 12d, the flow promoters 40d are again separated from the finished component (and, by way of example, disposed of or re-used). Another example in this regard is shown in FIG. 7.

FIG. 7 shows a construction which is similar to the example according to FIG. 6, for the production of a fiber composite sandwich component, wherein, in contrast to the example according to FIG. 6, two flow promoters 40e-1 and 40e-2 are not included as the outermost layers of the construction which will be inserted into the mold tool, and then again separated from the component following the completion of the component; rather, as illustrated in FIG. 7, they are joined between one of the fiber composite materials 12e-1, 12e-2 and the core 70e of the sandwich construction such that these flow promoters 40e remain as integral components in the finished component following the completion of the sandwich component.

This can be advantageous in certain circumstances—for example if, due to the corresponding selection of the materials of the flow promoters 40e, there should then be a corresponding modification of the interfaces between the core 70e and the cover layers 12e in the finished component. If the material and/or the materials of the flow promoters 40e-1 and 40e-2 dissolves in the resin, this can be used, by way of example, to achieve a suitable modification of the properties of the bonding of the sandwich cover layers to the sandwich core.

In the example according to FIG. 7, the flow promoters 40e-1, 40e-2 can also each provide, on both sides thereof, outlets for the purpose of conveying resin out of the respective flow spaces 48e-1 and/or 48e-2 in order to infiltrate or wet both the sandwich cover layers (fibrous materials 12e-1 and 12e-2) and also—at least partially—the sandwich core (e.g. if the same is constructed of paper or the like).

Particularly where open-cell or open-pore materials are used for the sandwich core 70e, by way of example, it may however be advantageous if the first layers 44e-1, 44e-2 adjacent to the core 70e do not provide any outlet for the purpose of conveying resin into the core 70e, but rather are coated on the sides thereof which face the core 70e with an adhesive, particularly a cross-linking adhesive, for example, to thereby achieve the bonding to the core 70e.

FIG. 8 shows a further embodiment wherein, similarly to the example according to FIG. 5, a construction is inserted into the appropriate mold tool or is created (constructed) in the appropriate mold tool, having a fibrous material 12f which is already bonded to a flow promoter 40f functionally assigned to the same.

The flow promoter 40f, whether empty or already filled with resin (via a resin feed tube 420, is enclosed in the illustrated example, together with the fibrous material 12f, by a film pouch 62f which is configured with an air discharge tube 54f.

The combined flow promoter/fibrous material construction illustrated in FIG. 8 can then be used within the scope of the invention analogously to the use described above for the example according to FIG. 5.

FIG. 9 shows a further example of a combined flow promoter/fibrous material construction, similar to the construction shown in FIG. 5.

The difference from the example according to FIG. 5 is that a second layer 46g of a flow promoter 40g is initially not permeable for resin. Rather, it is perforated later (in the mold tool) by means of perforation organs—in this case, perforation barbs 80g—included inside a flow space 48g. An outlet for the discharge of resin out of the flow space 48g and into the fibrous material 12g is therefore provided by the second layer 46g working together with the perforation barbs 80g.

The combined flow promoter/fibrous material construction illustrated in FIG. 9 can then be used within the scope of the invention analogously to the use described above for the example according to FIG. 5, wherein, when the tool is moved from the first tool position into the second tool position, the perforation barbs 80g perforate the second layer 46g with their tips such that the resin is conveyed into the fibrous material 12g.

In a further implementation of the infiltration process, using the construction shown in FIG. 9, the tool is first moved once or several times without the flow space 48g being filled with resin, in order to form perforations. Only then is resin fed into the flow space 48g via a resin feed tube 42g, whereupon the tool is again moved from the first into the second tool position.

The embodiments described above provide advantageous devices and methods for the production of fiber composite components in an RTM method modified by the use of a special flow promoter (that is, in a closed tool). It is advantageously possible for the distribution of the matrix material (resin) and the impregnation of the fibrous material to be carried out quickly. The risk of undesired fiber displacements, even at high injection pressures and/or volume flows of the conveyed matrix material, is significantly reduced as a result.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A device configured to infiltrate a fibrous material with resin for the production of a fiber composite component, wherein the device comprises a mold tool with a cavity which is enclosed by at least two tool parts,
   wherein the mold tool is configured for a relative movement of the at least two tool parts such, in a first tool position, a space is provided inside the cavity to hold the fibrous material, and an additional space is provided to accommodate resin, and wherein a size of the cavity can be reduced by a movement of the mold tool from the first tool position into a second tool position,
   wherein a self-contained flow promoter is inserted into the cavity,
   said flow promoter comprising at least one first layer and one second layer, connected to each other in an edge region of the flow promoter to enclose a flow space,
   wherein the first layer is impermeable to resin and is formed by a plastic film while the second layer is also formed by a plastic film and provides an outlet for guiding resin out of the flow space and into the fibrous material, and
   wherein the flow space of the flow promoter is filled with resin and/or the flow promoter has an inlet for conveying resin into the flow space.

2. The device according to claim 1, wherein the outlet of the second layer is provided by a perforation in the second layer and/or a permeability to resin of the second layer due to its material.

3. The device according to claim 1, further comprising a resin feed means for resin feed into the flow space of the flow promoter.

4. The device according to claim 1, further comprising an air discharge means for air discharge from the cavity.

5. The device according to claim 1, wherein the first layer of the flow promoter is impermeable to resin, but allows air passage, and the flow promoter also comprises a third layer which is impermeable to resin and air, is arranged on a side of the first layer facing away from the second layer, and is connected to the first layer in the edge region of the flow promoter.

6. The device according to claim 2, wherein the first layer of the flow promoter is impermeable to resin, but allows air passage, and the flow promoter also comprises a third layer which is impermeable to resin and air, is arranged on a side of the first layer facing away from the second layer, and is connected to the first layer in the edge region of the flow promoter.

* * * * *